(12) United States Patent
Fitts et al.

(10) Patent No.: US 7,454,750 B2
(45) Date of Patent: Nov. 18, 2008

(54) INTEGRATOR ADAPTOR AND PROXY BASED COMPOSITE APPLICATION PROVISIONING METHOD AND APPARATUS

(75) Inventors: Sean M. Fitts, Hayward, CA (US); Matthew T. Fryer, Oakland, CA (US); Keith R. Hertzer, Berkeley, CA (US); Timothy N. Jones, Oakland, CA (US); Martha G. Lyman, Oakland, CA (US)

(73) Assignee: Amberpoint, Inc., Oakland, CA (US)

( * ) Notice: Subject to any disclaimer, the term of this patent is extended or adjusted under 35 U.S.C. 154(b) by 682 days.

(21) Appl. No.: 10/236,404

(22) Filed: Sep. 6, 2002

(65) Prior Publication Data

US 2003/0079047 A1  Apr. 24, 2003

Related U.S. Application Data

(60) Provisional application No. 60/348,361, filed on Oct. 19, 2001.

(51) Int. Cl.
*G06F 9/46* (2006.01)
*G06F 3/00* (2006.01)
*G06F 15/16* (2006.01)

(52) U.S. Cl. .................. 718/100; 719/328; 709/203

(58) Field of Classification Search .................. 718/100; 719/328; 726/12; 709/203
See application file for complete search history.

(56) References Cited

U.S. PATENT DOCUMENTS

| 6,018,625 | A | 1/2000 | Hayball et al. |
| 6,351,474 | B1 | 2/2002 | Robinett et al. |
| 6,377,993 | B1 | 4/2002 | Brandt et al. |
| 6,470,386 | B1 | 10/2002 | Combar et al. |
| 6,735,586 | B2* | 5/2004 | Timmons ....................... 707/3 |
| 6,823,522 | B1* | 11/2004 | Lamb ........................ 719/316 |
| 6,988,274 | B2* | 1/2006 | Machin et al. .............. 719/328 |
| 2001/0047486 | A1* | 11/2001 | Green et al. ................ 713/201 |
| 2001/0052013 | A1 | 12/2001 | Munguia et al. |
| 2002/0103878 | A1 | 8/2002 | Moncibais |
| 2002/0103881 | A1 | 8/2002 | Granade et al. |
| 2002/0138582 | A1* | 9/2002 | Chandra et al. ............. 709/206 |
| 2002/0165993 | A1* | 11/2002 | Kramer ..................... 709/315 |

* cited by examiner

*Primary Examiner*—Meng-Ai An
*Assistant Examiner*—Kenneth Tang
(74) *Attorney, Agent, or Firm*—Cooley Godward Kronish LLP

(57) ABSTRACT

An integrator, a plurality of adapters corresponding to a plurality of applications, and a proxy are employed to cooperatively provision the applications as a composite application. In one embodiment, the integrator selectively invokes the appropriate adaptors, which in turn, invoke the proxy. Provision is switched from one application to another by the adaptor of a former application invoking the integrator, which in turn, invokes another application, via its adaptor. Each of the integrator and adaptors may through the proxy, modify a provisioned portion of one the applications. Selected ones of the integrator and adaptors may also have operations performed while the proxy is in a pre-proxy and/or a post-proxy state, thereby facilitating the cooperative provisioning of the applications. Further, modifications to facilitate subsequent requests to be redirected back to the integrator are distributed, and performed on the composite application consuming clients.

12 Claims, 21 Drawing Sheets

```xml
<?xml version="1.0" encoding="ISO-8859-1"?>
<weavelet name="acme-bigco" xmlns="http://crossweave.com/CAP/2.0"
 xmlns:cwd="http://crossweave.com/CAP/Doc/2.0">

<implements interface="Application"/> ~ 802

<service name="start"> ~ 804a
    <parameter name="parameters" rest="yes"/> ~ 806a
    <flow> ~ 808a
        <task name="startAcme"> ~ 810a
            <callService instance="acmeAdapter" service="createOrder"/> ~ 812a
        </task>
        <task name="submitOrder"> ~ 810b
            <callService instance="acmeAdapter" service="submitOrder"/> ~ 812b
        </task>
    </flow>
</service>

<weaveletInstance name="acmeAdapter" weavelet="acme.com/acme"> ~ 814
</weaveletInstance>

<implements interface="acme.com/acmeHandler"/> ~ 816

<registerHandler clientInstance="acmeAdapter" handler="handler"> ~ 818
</registerHandler>

<service name="acmePreProxy"> ~ 804b
    See Fig. 8c
</service>

<service name="acmeEditPage"> ~ 804c
    See Fig. 8d
</service>

<weaveletInstance name="bigcoAdapter" weavelet="bigco.com/bigco"> ~ 820
</weaveletInstance>

<weaveletInstance name="proxy" weavelet="Proxy"> ~ 822
</weaveletInstance>

```
Continue from Fig. 8a

<!--
private utility services
-->

<service name="addConfigureButton">  ~ 826
    <parameter name="page"/>  ~ 806b
    <javascript><![CDATA[ importPackage(Packages.com.crossweave.dqi);
        importPackage(Packages.com.crossweave.util);

var root = DQI.newDocumentQuery(page, true);
        var html = root.element("html");

// find the cell in which to add the configure button
        var targetCell = root.element("td").parent(root.element("input", "value", "Add"));

// insert the configure button and set attributes
        var configure = targetCell.results().addChild("input");
        configure.addAttribute("type", "submit");
        configure.addAttribute("name", "ConfigItem");
        configure.addAttribute("value", "Configure");

// Return the modified document
        output = root.getDocument();
        outputFormat="html";

]]></javascript>
</service>

</weavelet>
```

Figure 8b

```xml
<service name="acmePreProxy"> ~ 804b
  <parameter name="url"/> ~ 806c
  <parameter name="parameters"/> ~ 806d
  <flow> ~ 808b
    <connector destination="startBigCo" exprType="xpath"> ~ 828a
      boolean($parameters/ConfigItem)
    </connector>
    <task name="startBigCo"> ~ 810c
      <callService instance="bigcoAdapter" service="configureItem"> ~ 812c
        <parameter name="product"
          exprType="xpath">string($parameters/itemnum)</parameter>
      </callService>
    </task>
    <connector source="startBigCo" destination="addItems"/> ~ 828b
    <task name="addItems"> ~ 810d
      <foreach variable="it">
        <in exprType="xpath">$startBigCo/bom/item</in>
        <do>
          <callService instance="acmeAdapter" service="addItem" >
            <parameter name="item"
              exprType="xpath">string($it/code)</parameter>
            <parameter name="description"
              exprType="xpath">string($it/description)</parameter>
            <parameter name="quantity"
              exprType="xpath">string($it/quantity)</parameter>
          </callService>
        </do>
      </foreach>
    </task>
    <connector source="addItems" destination="continue"/> ~ 828c
    <task name="continue"> ~ 810e
    </task>
    <connector source="continue"> ~ 828d
    </connector>
  </flow>
</service>
```

Figure 8c

```
<service name="acmeEditPage"> ~ 804c
  <parameter name="page"/> ~ 806e
  <flow> ~ 808c
    <connector destination="insertButton"/> ~ 828e
    <task name="insertButton"> ~ 810f
      <callService service="addConfigureButton"> ~ 812d
        <parameter name="page" exprType="xpath">$page</parameter>
      </callService>
    </task>
    <connector source="insertButton" destination="makeResult"/> ~ 828f
    <task name="makeResult"> ~ 810g
      <callService instance="proxy" service="formatProxyHandlerResult"> ~ 812e
        <parameter name="replace" exprType="xpath">$insertButton</parameter>
      </callService>
    </task>
    <connector source="makeResult"/> ~ 828g
  </flow>
</service>
```

Figure 8d

```xml
<?xml version="1.0" encoding="ISO-8859-1"?>
<weavelet name="acme" xmlns="http://crossweave.com/CAP/2.0" xmlns:cwd="http://crossweave.com/CAP/Doc/2.0">   900

<implements interface="Adapter">   ~ 902
    </implements>

<handler name="handler" interface="acme.com/acmeHandler">   ~ 903
    </handler>

<service name="createOrder">   ~ 904a
        See Fig. 9c
    </service>

<service name="addItem">   ~ 904b
        See Fig. 9c
    </service>

<service name="submitOrder">   ~ 904c
        See Fig. 9c
    </service>

<weaveletInstance name="proxy" weavelet="Proxy"/>   ~ 906
    </weaveletInstance>

<implements interface="ProxyHandler"/>   ~ 908

<registerHandler clientInstance="proxy" handler="proxyHandler">   ~ 910
    </registerHandler>

<service name="preProxy">   ~ 912
        See Fig. 9d
    </service>

<service name="postProxy">   ~ 914
        See Fig. 9d
    </service>
        Continue in Fig. 9b
```

Figure 9a

```
Continue from Fig. 9a

<!--
private utility services and such
-->

<variable name="createURL">  ~ 918a
$CW_PROTOCOL$CW_SERVER_ADDR/CW/app/Acme/CreateOrder.jsp
</variable>

<variable name="editURL">  ~ 918b
$CW_PROTOCOL$CW_SERVER_ADDR/CW/app/Acme/EditOrder.jsp
</variable>

<service name="postToUrl" private="yes">  ~ 920
    <parameter name="url"/>
    <parameter name="params"/>
    <url/>
</service>

</weavelet>
```

Figure 9b

```
<service name="createOrder">   ~ 904a
    <flow>
        <task name="doProxy">
            <callService instance="proxy" service="proxy">
                <parameter name="CWUrl" exprType="xpath">$createURL</parameter>
            </callService>
        </task>
    </flow>
</service>
<service name="addItem">   ~ 904b
    <parameter name="item"/>
    <parameter name="description"/>
    <parameter name="quantity"/>
    <flow>
        <task name="post">
            <callService service="postToUrl">
                <parameter name="url">$editURL</parameter>
                <parameter name="params" exprType="map">
                    <entry name="AddItem">1</entry>
                    <entry name="itemnum">$item</entry>
                    <entry name="desc">$description</entry>
                    <entry name="quantity">$quantity</entry>
                </parameter>
            </callService>
        </task>
        <task name="returnNull"/>
    </flow>
</service>
<service name="submitOrder">   ~ 904c
    <flow>
        <task name="post">
            <callService service="postToUrl">
                <parameter name="url">$editURL</parameter>
                <parameter name="params" exprType="map">
                    <entry name="CompleteOrder"> Complete Order </entry>
                </parameter>
            </callService>
        </task>
    </flow>
</service>
```

Figure 9c

```xml
<service name="preProxy"> ~ 912
  <parameter name="url"/>
  <parameter name="parameters"/>
  <flow>
    <connector destination="complete" exprType="xpath">
        boolean($parameters/CompleteOrder)
    </connector>
    <task name="complete">
      <callService instance="proxy" service="formatProxyHandlerResult">
        <parameter name="disposition">stop</parameter>
      </callService>
    </task>
    <connector source="complete"/>
    <connector destination="forward" default="yes"/>
    <task name="forward">
      <cwd:description>
        Just forward this up to our handler.
      </cwd:description>
      <callHandler handler="handler" service="acmePreProxy">
        <parameter name="url" exprType="xpath">$url</parameter>
        <parameter name="parameters" exprType="xpath">$parameters</parameter>
      </callHandler>
    </task>
    <connector source="forward"/>
  </flow>
</service>
<service name="postProxy"> ~ 914
  <parameter name="url"/>
  <parameter name="parameters"/>
  <parameter name="proxiedPage"/>
  <flow>
    <connector destination="atEdit" exprType="xpath">
        boolean(not($parameters/CompleteOrder) and $url=$editURL)
    </connector>
    <task name="atEdit">
      <callHandler handler="handler" service="acmeEditPage">
        <parameter name="page" exprType="xpath">$proxiedPage</parameter>
      </callHandler>
    </task>
    <connector source="atEdit"/>
  </flow>
</service>
```

Figure 9d

```
<?xml version="1.0" encoding="ISO-8859-1"?>
<weavelet name="bigco" xmlns="http://crossweave.com/CAP/2.0" xmlns:cwd="http://crossweave.com/CAP/Doc/2.0">

<implements interface="Adapter">  ~ 1002
    </implements>

<service name="configureItem">  ~ 1004
        See Fig. 10c
    </service>

<weaveletInstance name="proxy" weavelet="Proxy">  ~ 1006
    </weaveletInstance>

<implements interface="ProxyHandler"/>  ~ 1008

<registerHandler clientInstance="proxy" handler="proxyHandler">  ~ 1010
    </registerHandler>

<service name="preProxy">  ~ 1012
        See Fig. 10d
    </service>

<service name="postProxy">  ~ 1014
        See Fig. 10d
    </service>

Continue from Fig. 10a

```
<!--
private utility services
-->

<variable name="startURL">  ~ 1018a
$CW_PROTOCOL$CW_SERVER_ADDR/CW/app/BigCo/ConfigureProduct.jsp
</variable>

<variable name="bom">  ~1018b
</variable>

<service name="makeBOM">  ~ 1020a
    See Fig. 10e
</service>

<service name="addDoneButton">  ~ 1020b
    See Fig. 10f
</service>

</weavelet>
```

Figure 10b

```xml
<service name="configureItem"> ~ 1004
    <parameter name="product"/>
    <flow> ~ 1022a
        <connector destination="doProxy"/>
        <task name="doProxy"> ~ 1026a
            <callService instance="proxy" service="proxyForm">
                <parameter name="actionUrl" exprType="xpath">$startURL</parameter>
                <parameter name="product" exprType="xpath">$product</parameter>
            </callService>
        </task>
        <connector source="doProxy" destination="returnBOM"/>
        <task name="returnBOM">
            <evaluate exprType="xpath">
                $bom</evaluate>
        </task>
        <connector source="returnBOM"/>
    </flow>
</service>

<service name="preProxy"> 1012
    <parameter name="url"/>
    <parameter name="parameters"/>
    <flow> ~ 1022b
        <connector destination="stop" exprType="xpath">
            boolean($parameters/Done)
        </connector>
        <task name="stop">
            <callService instance="proxy" service="formatProxyHandlerResult">
                <parameter name="disposition">stop</parameter>
            </callService>
        </task>
        <connector source="stop"/>
    </flow>
</service>
```

Figure 10c

```
<service name="postProxy"> ~ 1014
    <parameter name="url"/>
    <parameter name="parameters"/>
    <parameter name="proxiedPage"/>
    <flow> ~ 1022c
        <connector destination="makeBOM" exprType="xpath" >
            oolean($proxiedPage//input[@value='Print'])
        </connector>
        <task name="makeBOM" >
            <callService service="makeBOM" >
                <parameter name="page" exprType="xpath" >$proxiedPage</parameter>
            </callService>
        </task>
        <connector source="makeBOM" destination="saveBOM"/>
        <task name="saveBOM"> ~ 1026e
            <setVariable variable="bom" exprType="xpath" >$makeBOM</setVariable>
        </task>
        <connector source="saveBOM" destination="addDoneButton"/>
        <task name="addDoneButton" >
            <callService service="addDoneButton" >
                <parameter name="page" exprType="xpath" >$proxiedPage</parameter>
            </callService>
        </task>
        <connector source="addDoneButton" destination="makeResult"/>
        <task name="makeResult">
            <callService instance="proxy" service="formatProxyHandlerResult">
                <parameter name="replace" exprType="xpath" >$addDoneButton</parameter>
            </callService>
        </task>
        <connector source="makeResult"/>
    </flow>
</service>
```

Figure 10d

```
<service name="makeBOM"> ~ 1020a
<parameter name="page"/>
<cw:xslt xmlns:cw="http://crossweave.com/CAP/2.0" xmlns="">
    <xsl:stylesheet xmlns:xsl="http://www.w3.org/1999/XSL/Transform" version="1.0">
        <xsl:output method="html"/>
        <xsl:template match="/">
            <bom>
                <xsl:for-each select="/input/page//table[tr/th='Item']/tr[td and position() < last()]">
                    <item>
                        <code>
                            <xsl:value-of select="normalize-space(td[1])"/>
                        </code>
                        <description>
                            <xsl:value-of select="normalize-space(td[2])"/>
                        </description>
                        <quantity>
                            <xsl:value-of select="normalize-space(td[3])"/>
                        </quantity>
                    </item>
                </xsl:for-each>
            </bom>
        </xsl:template>
    </xsl:stylesheet>
</cw:xslt>
</service>
```

Figure 10e

```
<service name="addDoneButton">  ~ 1020b
  <parameter name="page"/>
  <javascript><![CDATA[ importPackage(Packages.com.crossweave.dqi);
    importPackage(Packages.com.crossweave.util);

var root = DQI.newDocumentQuery(page, true);
    var html = root.element("html");
    html.results().addParent("replace");
    var table = root.text("Item").firstContainer("table");

// Insert a table row which contains the done button
    var row = table.results().addChild("tr");
    var cell = row.addChild("td");
    cell.addAttribute("colspan","3");
    cell.addAttribute("align","center");
    var button = cell.addChild("input");
    button.addAttribute("type","submit");
    button.addAttribute("name", "Done");
    button.addAttribute("value", "Done");

// Return the modified document
    output = root.getDocument();
    outputFormat = "html";

]]></javascript>
</service>
```

INTEGRATOR ADAPTOR AND PROXY BASED COMPOSITE APPLICATION PROVISIONING METHOD AND APPARATUS

RELATED APPLICATION

This patent application claims benefit of priority to provisional patent application No. 60/348,361, titled "SYSTEM AND METHOD OF SYNTHESIZING APPLICATIONS BY RE-PURPOSING AND INTEGRATING WEB-BASED APPLICATIONS", filed Oct. 19, 2001, which specification is hereby fully incorporated by reference.

FIELD OF THE INVENTION

The present invention relates to the field of data processing. More specifically, the present invention is related to the provisioning of composite applications, in particular, composite web based applications.

BACKGROUND OF THE INVENTION

Over the past decades, an incredibly rich and diverse collection of computer implemented applications offering huge amounts of information and the ability to interact and request services directly from a variety of businesses has been deployed. In recent years, with the advance of Web-based applications, the rate of deployment has further accelerated.

The World Wide Web (hereafter, the Web) was originally conceived as an information sharing system. It provided a way for information owners to publish documents in a standardized format and to create "links" to related information anywhere on the Internet. These documents could be accessed using a simple, ubiquitous client providing essentially universal access. Although the Web was originally designed around mostly static content, people quickly realized it could be used to deliver applications. This was accomplished by dynamically generating the published information and by embedding processing instructions in the published documents. The Web rapidly evolved from an information sharing system to an application platform and before long, Web-based applications became the standard used by an increasing number of corporations, both internally and externally via the Internet.

Application developers should be able to synthesize new applications, i.e. composite applications, by integrating new, custom application logic and existing applications.

Further, a user of the new composite application should be able to see the new composite application being seamlessly tailored to that user and the new application, and not just a hodgepodge of different applications and styles placed together in an inconsistent or incompatible haphazard manner.

Moreover, it will be desirable for the new composite application to be provisioned without causing the original data and applications to be changed or disturbed in any substantial manner, nor requiring non-insubstantial support from the original application administrators and developers. It will be most desirable if the new application developer can present and use the existing applications and data in ways not necessarily even foreseen (or foreseeable) by the original developers and users.

However, each corporation—and often each department within a corporation—typically uses a different set of data, technologies, rules, and applications, and has no desire to change the way they work or rewrite existing applications. Additionally, administrators and developers associated with these applications may be unable or unwilling to devote any resources or time to supporting access to the applications; they are also typically resistant to externalizing interfaces to the applications, retrofitting integration adaptors or hooks, or adding administrative procedures or data just to suit the new application.

Thus, an improved approach is needed to provision composite applications formed from a number of underlying applications (typically, previously implemented), in the above described desired manner, overcoming the disadvantages and difficulties of the prior art.

BRIEF DESCRIPTION OF THE DRAWINGS

The present invention will be described by way of exemplary embodiments, but not limitations, illustrated in the accompanying drawings in which like references denote similar elements, and in which:

FIGS. 8a-8d illustrate an example composite application integrator of an example composite application;

FIGS. 9a-9d illustrate an example application adaptor of one of the underlying applications of the example composite application; and FIGS. 10a-10f illustrate another example application adaptor of another one of the underlying applications of the example composite application.

SUMMARY OF THE INVENTION

Figure 1:
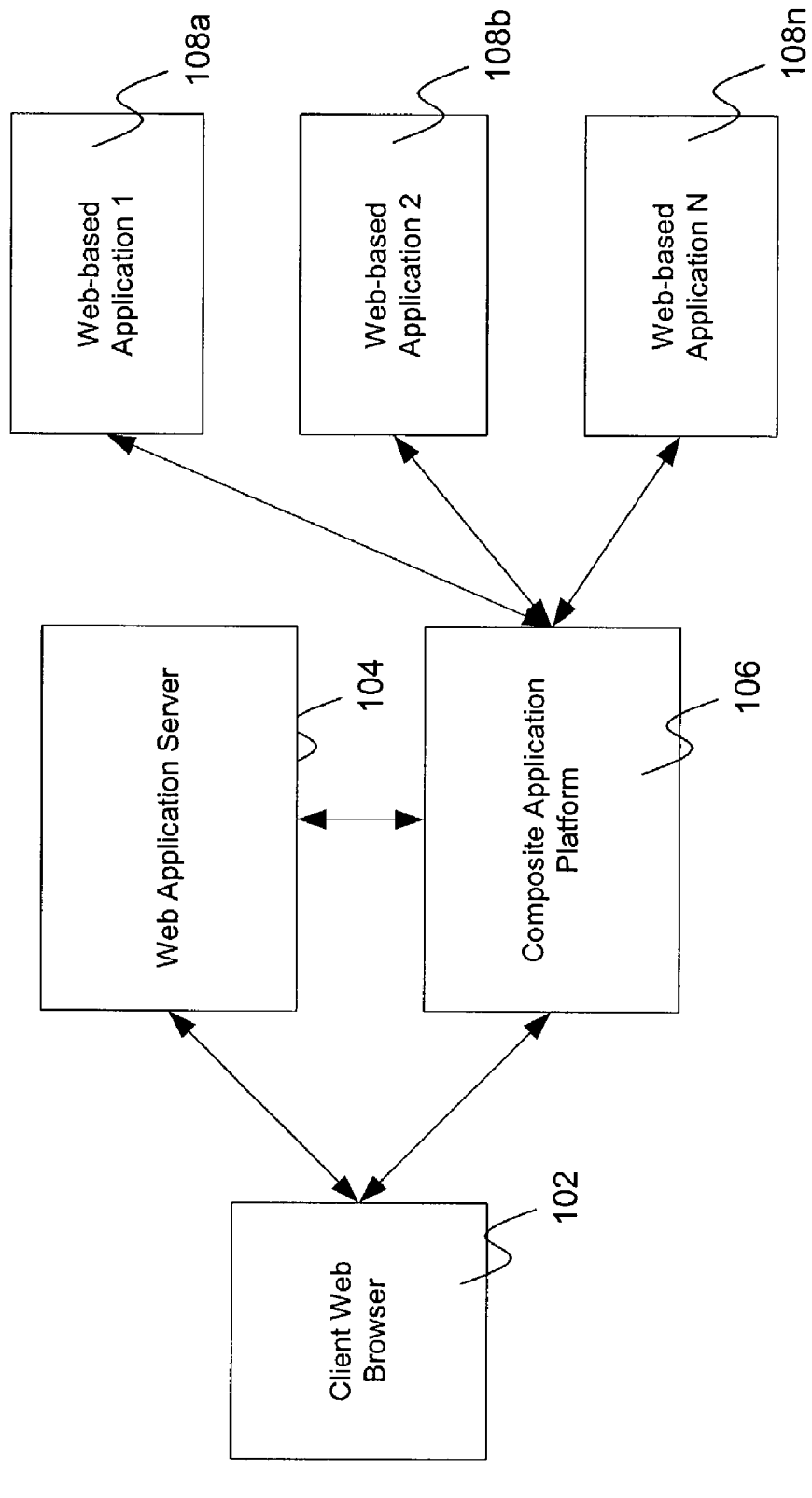
FIG. 1 illustrates an overview of the present invention, in accordance with one embodiment.

Briefly, the present invention includes a composite application provisioning method and apparatus.

In accordance with one aspect, a composite application integrator a number of corresponding application adaptors, and a proxy are employed to provision a composite application formed from a number of underlying applications, in particular, applications that employ a request and response protocol.

In accordance with another aspect, the composite application integrator and application adaptors include invocable services.

In accordance with yet another aspect, the composite application integrator implements a handler interface, with the application adaptors as its handler clients.

In accordance with yet another aspect, the proxy has pre-proxy and post-proxy states, and the application adaptors include pre-proxy and post-proxy state operations.

In accordance with yet another aspect, the composite application integrator and/or selected one/ones of the application adaptors may modify a proxied portion of an underlying application.

In accordance with yet another aspect, modifications to facilitate subsequent requests to be redirected back to the integrator are distributed, and performed on the composite application consuming clients.

In accordance with yet another aspect, the underlying applications are Web-based applications.

DETAILED DESCRIPTION OF EMBODIMENTS

In the following description, various embodiments of the present invention will be described. In particular, they are embodiments where the composite applications formed from underlying Web-based applications. From the descriptions to follow, those skilled in the art would appreciate that the present invention is not limited to Web-based applications. The present invention may be practiced in other non-Web-based embodiments.

For purposes of explanation, specific numbers, materials and configurations are set forth in order to provide a thorough understanding of the present invention. However, it will be apparent to those skilled in the art that the present invention may be practiced with only some of these details, and/or with other elements. In other instances, well-known features are omitted or simplified.

Terminology

Parts of the description will be presented in data processing terms, such as data, interface, handler, proxy, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Part of the descriptions will employ various abbreviations, including but are not limited to:

| | |
|---|---|
| CDROM | Compact Disc Read Only Memory |
| DDRAM | Dynamic Direct Random Access Memory |
| DVD | Digital Versatile Disc |
| ECMA | European Computer Manufacturers Association |
| HTTP(S) | Hypertext Transmission Protocol (over SSL) |
| SDRAM | Static Direct Random Access Memory |
| SOAP | Simple Object Access Protocol |
| SSL | Secure Sockets Layer |
| TCP/IP | Transmission Control Protocol/Internet Protocol |
| URL | Uniform Resource Locator |
| XML | eXtended Markup Language |

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having", "including" and other constructs of the like, are synonymous, unless the context dictates otherwise.

Overview

We refer now to FIG. 1, wherein a block diagram illustrating an overview of a web-based embodiment of the present invention, is shown. As illustrated, for the embodiment, a conventional web application server 104 is advantageously augmented with composite application platform (CAP) 106 incorporated with the teachings of the present invention. As a results of the services offered by CAP 106, a user 102, also referred as a client, using e.g. a generic client agent, such as client web browser, may access and use a number of Web-based applications 108a-108n, in a composite or integrated manner. (Hereinafter, either the user/client or his/her computing device and/or generic agent/browser may be referred as 102).

As will be described in more detail below, composite application platform 106 enables a composite application developer to efficiently inject logic to integrate Web-based applications 108a-108n, enabling applications 108a-108n to be presented in a coherent manner, as opposed to haphazardly. Of course, generally, the degree of integration is dependent on the nature and number of the applications, and the amount of integration logic provided by a composite application developer.

Figure 6:
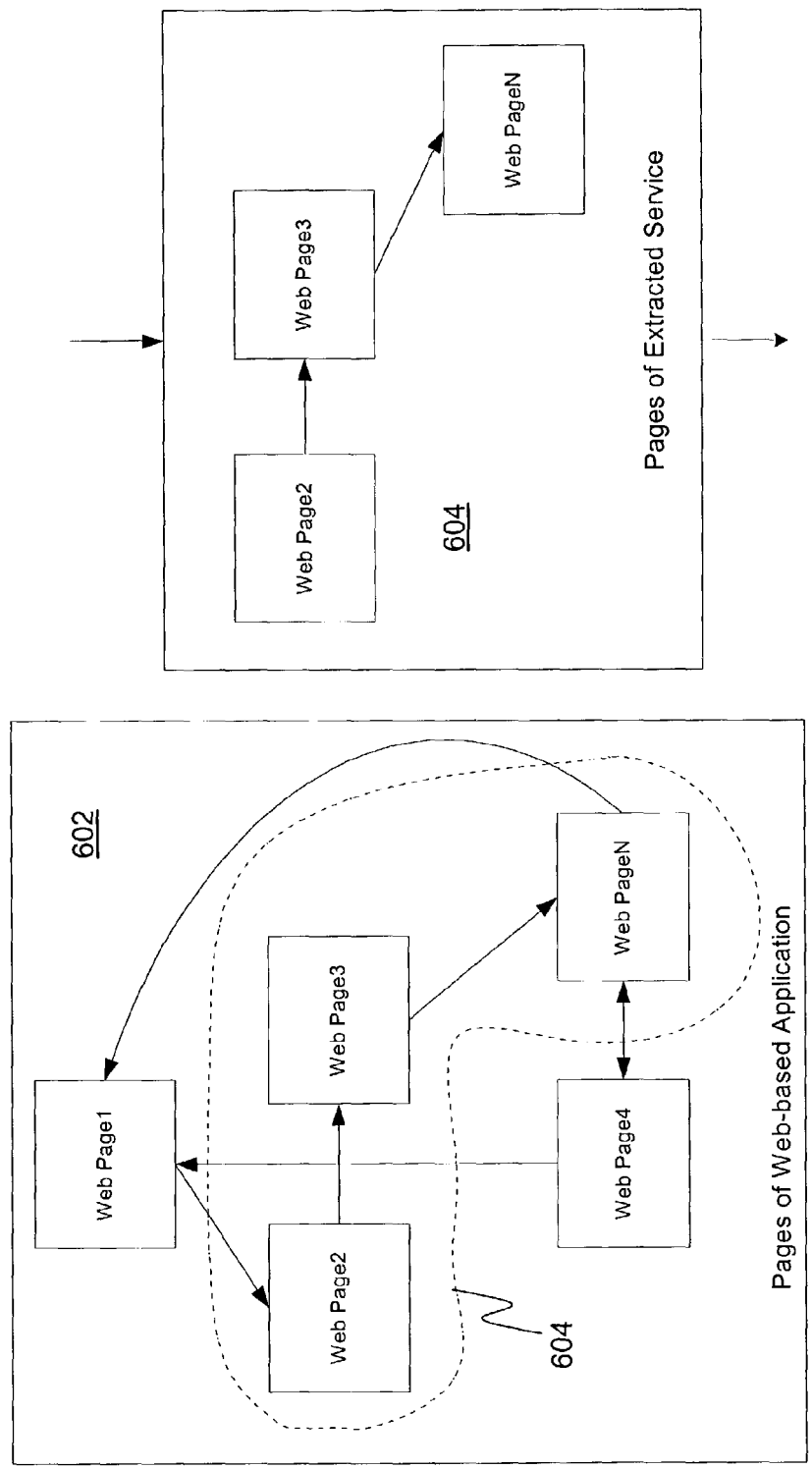
FIG. 6 illustrates extraction of a subset of an application, in accordance with one embodiment.

Further, as illustrated by FIG. 6, the present invention also enables a composite application developer to extract and provision only a subset of the functionalities of an application. For the example extraction of example Web-based application 602, only the functionalities offered by web pages 604, as opposed to all functionalities offered by all web pages of application 602.

Resultantly, practicing the present invention, a composite application developer, may even synthesize new application using existing applications in whole or in part.

Continuing to refer to FIG. 1, generally, the illustrated Web-based embodiments operate as follows:

Requests are generated either directly from a client Web browser 102 or via a Web application server 104. These requests come to CAP 106, which interprets them and forwards them (possibly after modification) to the appropriate Web-based applications 108a-108n. The Web-based applications 108a-108n process the requests, and returns the results to client 102 via CAP 106. CAP 106 may further interpret and process the results, before forwarding the final results to client 102.

In various embodiments, the processing includes modification of the results returned, such that all or selected ones of subsequent requests may be redirected to CAP 106. This processing may consist e.g. altering all static URL's contained within the HTML so that they are directed back to CAP 106. It also may involve parsing all ECMA script code so that any dynamically constructed URL's are similarly modified. The exact nature of the processing or modification is application dependent.

In other embodiments, Web browser 102 is advantageously augmented with complementary processing logic to perform the processing to cause the subsequent requests to be directed back to CAP 106. In other words, for these embodiments, modification of the returned results to cause the subsequent requests to be directed back to CAP 106 is advantageously delegated to client 102. In some of these embodiments, where Web browser 102 is constructed in an object-oriented manner, the complementary processing logic to modify the returned results to cause the subsequent requests to be directed back to CAP 106 is provided as an extension to the object model of Web browser 102.

These and other aspects of the process will be further described below.

For the illustrated Web-based embodiment, the communications between the participants, i.e. client 102, Web application server 104, CAP 106 and applications 108a-108n, are accomplished using the common Internet protocols of HTTP and HTTPS. In other embodiments, other communication protocols may be employed instead.

Composite Application Platform

Figure 2:
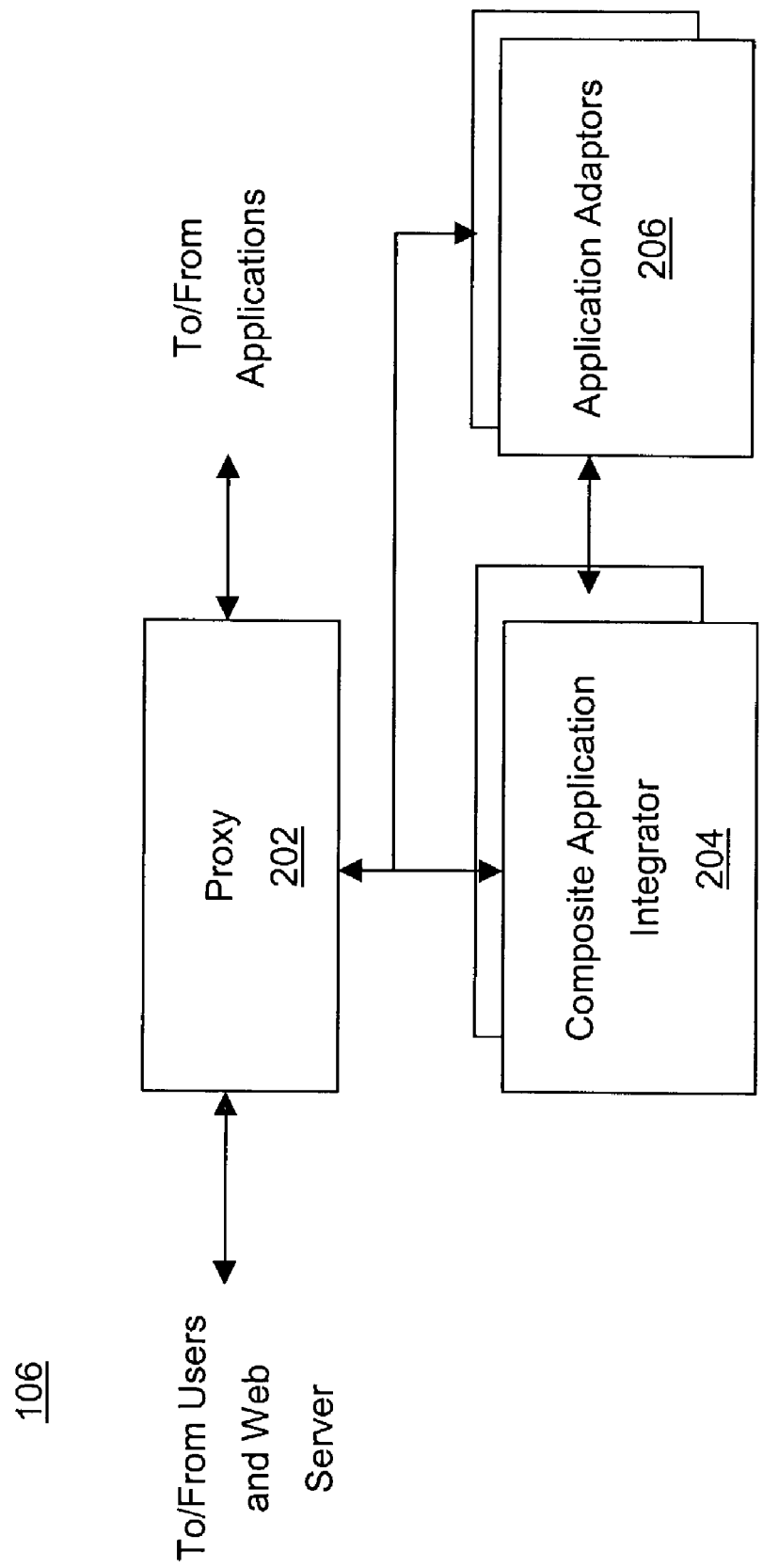
FIG. 2 illustrates the composite application platform of FIG. 1, in accordance with one embodiment.

FIG. 2 illustrates CAP 106 in further details, in accordance with one embodiment. As illustrated, for the embodiment, CAP 106 includes proxy services 202, composite application integrator 204, application adaptors 206, and a number of miscellaneous runtime services (not shown). The elements are communicatively coupled to each other, and to the users/web servers 102/104 and applications 108a-108n as shown.

Composite application integrator 204 and application adaptors 206 are provided by a composite application developer in accordance with the principles of the present invention. Each includes at least a number of services. Typically, one application adaptor 206 is provided for each underlying application to be employed to form the composite application. Composite application integrator 204 cooperates with application adaptors 206 and proxy 202 to enable a user 102 to use the applications together, in an integrated manner.

Proxy 202 and other runtime services provide a number of runtime services during execution. Proxy 202 in particular, is employed to proxy the provisioning of various portions of the underlying applications 108a-108n to the users 102, including receiving the users' interactions and forwarding the users' inputs to applications 108a-108n. Examples of the miscellaneous runtime services include conventional memory allocations, exceptions and interrupt routings and so forth.

Generally, CAP 106 operates as follows:
1) When a user 102 first accesses an "integrated" application, a session is established within CAP 106 by the runtime services. Establishment of the session may include e.g. associating the user's identity with a persistent user profile, as well as performing our session initialization activities. The established session represents a "user", and is used to execute all subsequent requests for the "user".
2) Once a session has been established, it is used to request execution of a "composite application integrator" (CAI) 204 on behalf of the session's user. The request may e.g. be in the form of a URL containing the base address of CAP 106 and the identity of CAI 204. The runtime services use this identity to locate CAI 204, which in one embodiment is an XML file that contains the integration definitions and logic. The request is constructed outside CAP 106 and may be contained in an HTML link on some web page or be constructed and sent programmatically from another Web application.
3) The definition and logic of the identified CAI 204 describes and provisions a sequence of services to be invoked, and how the output of each service is to be used. The services themselves may fall in to 2 categories:
    a. Application Services—application services interact directly with some existing Web applications and encapsulate some functionality provided by each of the Web applications. The interaction with the existing Web applications are made through the corresponding application adaptors 206.
    b. Composite Services—composite services combine 2 or more other services (which themselves may be composite or application) and define the sequencing between these services and the handling of their outputs.
4) Invocation of an application service results in a series of one or more requests being issued to the application supplying the service through application adaptors 206. These requests may access data from the parameters passed to the service, the output of previous requests, and the user profile of the current session. This allows the service execution to be altered based on the context of the CAI 204 in which it is executing. The result of each request is a response that falls into one of two categories:
    a. A response that should be sent to the user so that they can directly access the underlying application and guide the execution of the service. As described earlier, the response is processed so that any subsequent requests will be directed back to CAP 106. This processing may consist e.g. altering all static URL's contained within the HTML so that they are directed back to CAP 106. It also may involve parsing all ECMA script code so that any dynamically constructed URL's are similarly modified. In addition, the response may be modified in order to remove undesired content and/or URL's and to alter the formatting of the remaining content. Further, the processing may be advantageously delegated to client 102.
    b. A response that represents, in whole or in part, the output of the service itself. In this case, the response may be processed to remove undesired content and to alter the formatting of the remaining content. It may also be transformed from an unstructured format such as HTML to a more structured XML-based representation. Once all of the data needed to produce the output of the service has been obtained, it will be returned to the caller and processed however the caller desires.
5) The return of a "re-directed" response (from category "a" above) may result in subsequent requests from the user. These requests are associated with the service from which they originated and execution of that service is continued from the spot at which the request was sent. The continued execution of the service results in more processing as described above in (3). In various embodiments, CAP 106 may provide an audit trail of all interactions with the underlying applications.
6) When a service completes, its final response is returned to the caller as output. This output can be used to decide which service(s) to call next and/or passed to subsequent services for processing. It can also be used to construct the final response for CAI 204, which is provided to user/client 102 through proxy 202.

Accordingly, underlying applications, in particular, web based applications may be relatively efficiently integrated, or extracted to synthesize new applications.

Composite Application Integrator

Figure 3:
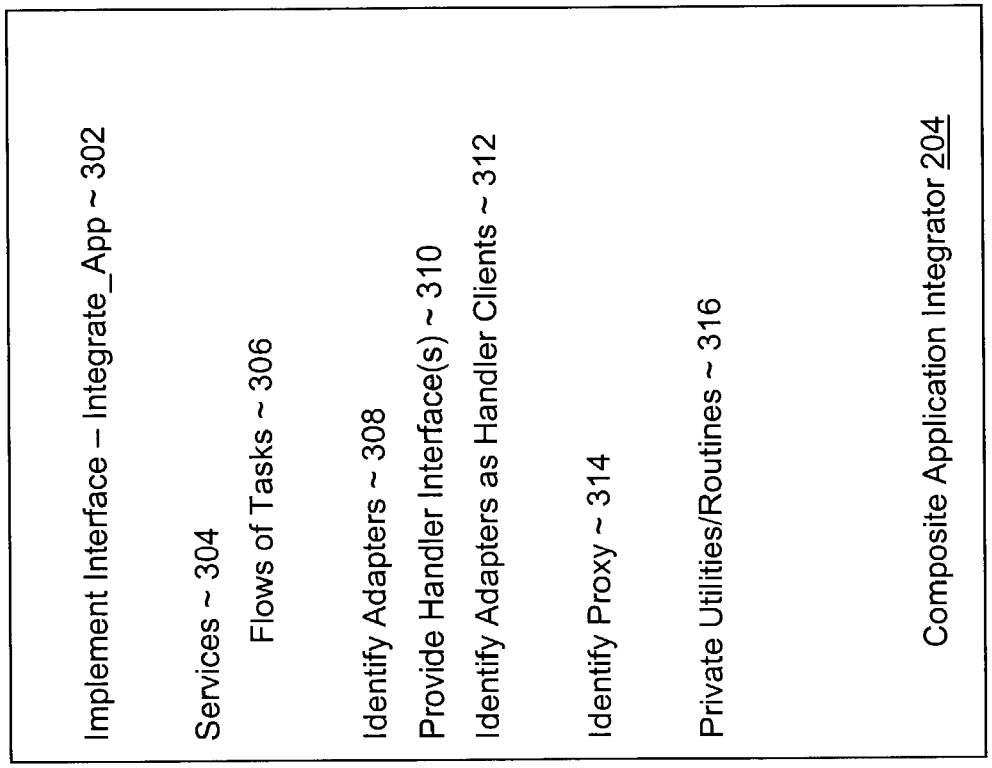
FIG. 3 illustrates the composite application integrator of FIG. 2 in further detail, in accordance with another embodiment.

Referring now to FIG. 3, wherein an outline of a composite application integrator 204, in accordance with one embodiment, is illustrated. The embodiment assumes an object-oriented implementation. However, from the description to follow, those skilled in the art will appreciate that the present invention is not so limited. In alternate embodiments, other implementation techniques may be employed to achieve the same purpose.

As illustrated, a composite application integrator 204 includes an identification or declaration identifying/declaring the file as a composite application integrator. For the embodiment, it is done via a declaration of implementation of an interface of the type "Integrate_Application" 302.

As alluded to earlier, a composite application integrator 204 includes a number of services 304, each having a flow of tasks 306, providing one or more "integration" services. The exact nature of the "integration" is application dependent.

For the embodiment, a composite application integrator 204 also identifies the corresponding adaptors of the underlying applications being "integrated" 308.

Further, for the embodiment, a composite application integrator 204 may also identify/declare a handler interface, and the fact that one or more of the adaptors of the underlying applications are its clients, 310-312.

A composite application integrator 204 also identifies proxy service 202 of CAP 106.

A composite application integrator 204 may also include a number of "private" utilities or services, i.e. utilities/services for its own use, and not invoked by adaptors 206.

Application Adaptor

Figure 4:
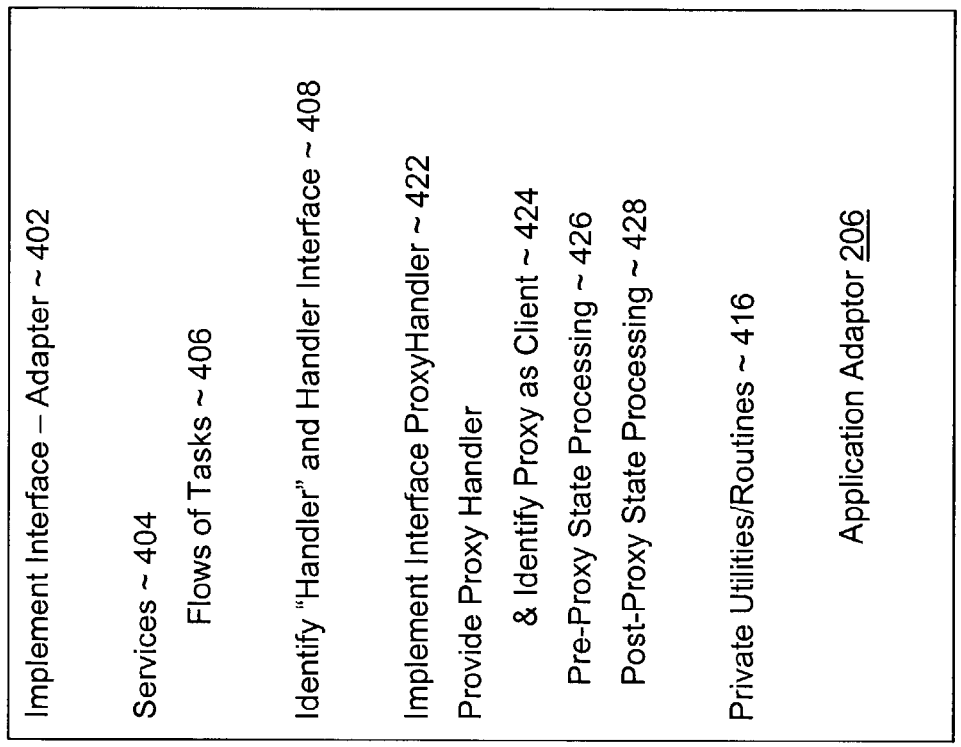
FIG. 4 illustrates the application adaptor of FIG. 2 in further detail, in accordance with another embodiment.

Referring now to FIG. 4, wherein an outline of an application adaptor 206, in accordance with one embodiment, is illustrated. The embodiment also assumes an object-oriented implementation. However, from the description to follow, those skilled in the art will also appreciate that the present invention is not so limited. In alternate embodiments, other implementation techniques may be employed to achieve the same purpose.

As illustrated, an application adaptor 206 includes an identification or declaration identifying/declaring the file as an application adaptor. For the embodiment, it is done via a declaration of implementation of an interface of the type "Adaptor" 402.

As alluded to earlier, an application adaptor 206 includes a number of services 404, each having a flow of tasks 406, providing one or more "adaptation" services of a corresponding underlying application. The exact nature of the "adaptation" is application dependent.

For the embodiment, an application adaptor 206 also identifies its handler and the handler interface (which as described earlier, is the composite application integrator) 408.

Further, an application adaptor 206 also declares an implementation of a "ProxyHandler" interface 422, provides for a proxy handler, and identifies proxy 202 as the handler's client, 424. Additionally, an application adaptor 206 may also provide for pre-proxy state as well as post-proxy state operations, 426-428.

Similarly, an application adaptor 206 also may also include a number of "private" utilities or services, i.e. utilities/services for its own use, and not invoked by integrator 204.

Proxy

Figure 5:
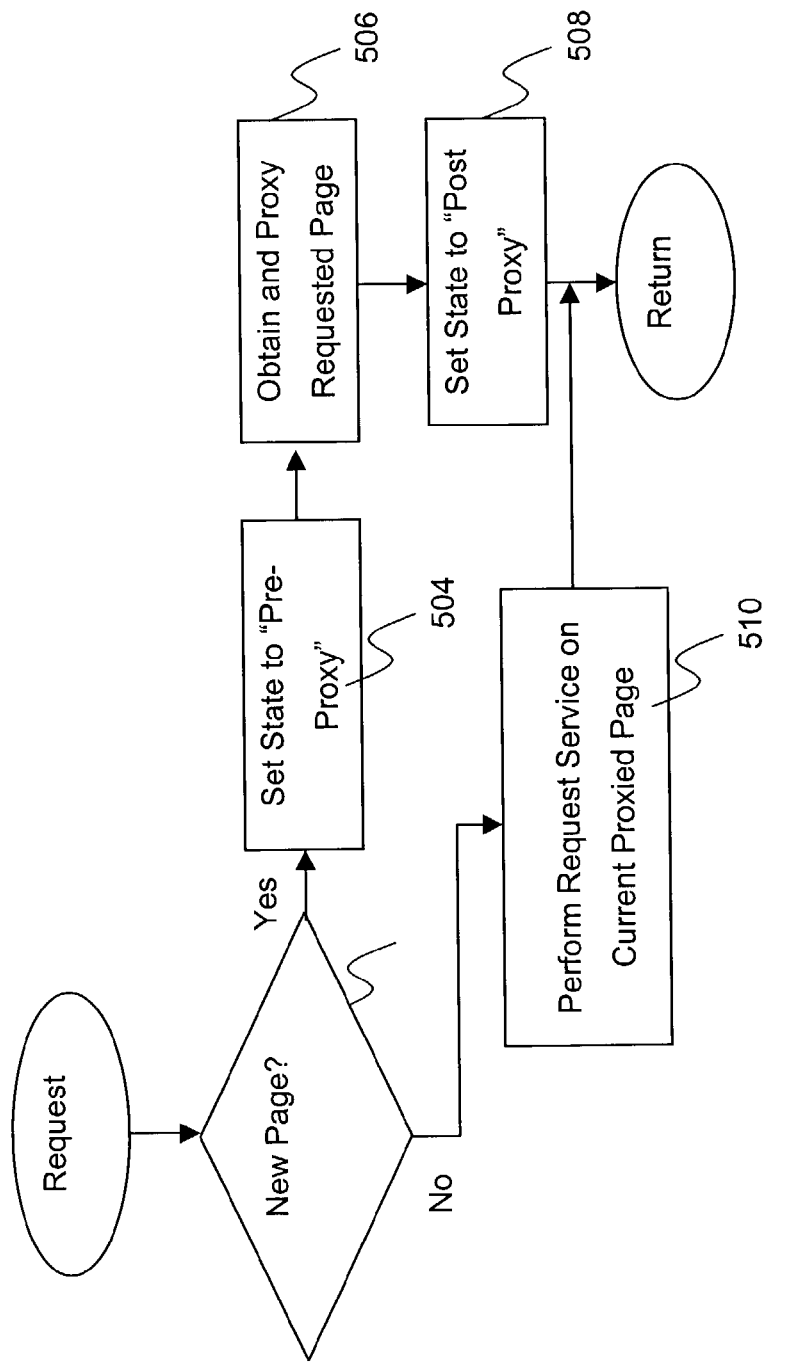
FIG. 5 illustrates the operational flow of the relevant aspect of the proxy of FIG. 2, in accordance with another embodiment.

Referring now to FIG. 5, wherein a flow diagram illustrating the operation flow of the relevant aspects of proxy 202, in accordance with one embodiment, is shown. As illustrated, in response to the receipt of a request to provision a web page of an underlying application being integrated, proxy 202 determines whether the request is associated with the provisioning of a new web page, block 502.

If the request is for a new web page, proxy 202 sets its operating state to a pre-proxy state (resulting in the execution of the pre-proxy state operations of the various adaptors 206), block 504. Thereafter, proxy 202 retrieves the requested page and provisions it for the user/client 102, block 506. Upon provisioning the "proxied" page, proxy 202 sets its operating state to a post-proxy state (resulting in the execution of the post-proxy state operations of the various adaptors 206), block 508.

Back at block 502, if it is determined that the new request is not for the provisioning of a new page, the request is assumed to be for an operation or service to be performed against or on the currently provisioned/proxied web page. Accordingly, proxy 202 performs the requested operation or service on the currently proxied web page.

Adaptors 206 may be notified of the proxy's states using any one of a number of state notification techniques known in the art.

EXAMPLE COMPUTING SYSTEM

Figure 7:
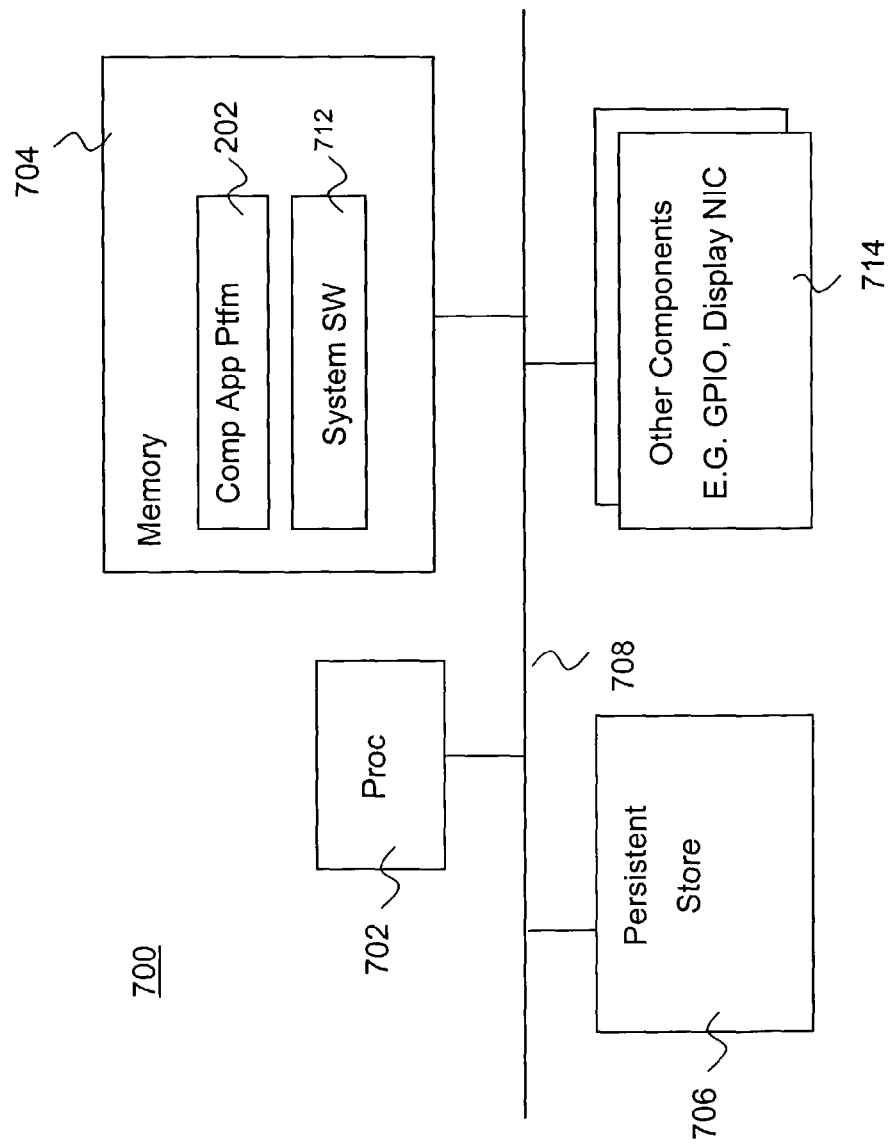
FIG. 7 illustrates an example computer system suitable for use to practice the present invention.

FIG. 7 illustrates an example computer system, suitable for use to practice the present invention, in accordance with one embodiment. Depending on the performance characteristics of the illustrated elements, example computer system 700 may be employed as a client device of the user or as a server hosting the web application server 104 and/or CAP 106.

As illustrated, computer system 700 includes processor(s) 702, memory 704 and persistent store 708, and various I/O components 710, coupled to each other via bus 708. I/O components 710 may e.g. include a display device, a keyboard, a cursor control device, and so forth.

Memory 704 and persistent store 706 are employed to store the working and permanent copy of the composite application platform 106 of the present invention, along with other system software 712. Persistent store may be a EEPROM (or like kind variants, such as a Flash Memory, a Memory Stick), a magnetic or optical disk drive, a CDROM, a DVD drive and so forth. Memory 704 may be any SDRAM, DDRAM or other high speed volatile as way as non-volatile storage devices known in the art.

Processor 702 is employed to execute CAP 106 and other system software 712.

Except for CAP 106 and the manner the various elements of FIG. 4 are used to practice the present invention, the other illustrated elements are known in the art, and accordingly will not be further described.

EXAMPLE APPLICATION

FIGS. 8a-8d, 9a-9d, and 10a-10f illustrate an example integrated application provisioned by applying the principles of the present invention. Illustrated in FIGS. 9a-9d and 10a-10f are two example application adaptors 206 for two example corresponding underlying applications, an order entry application (ACME), and an arbitrary application having a product configuration function (also referred to as the product configurator). The two example adaptors 206, as described earlier, facilitate access or interacting with the corresponding underlying "order entry" and "configurator" applications respectively.

Illustrated in FIGS. 8a-8d is an example composite application integrator 204 integrating the two underlying "order entry" and "configurator" applications. The services offered by integrator 204 include a service to edit an "order" page of the order entry application to insert a "configure order" button for a user/client 102 to initiate an editing process for an order.

The services offered by integrator 204 also include a service to invoke the "order configurator" application (through its adaptor) for the user/client 102 to use, in response to the user/client's selection of the inserted "edit order" button.

As illustrated, example composite application integrator 204 identifies/declares implementation of the "Integrate_Application" interface 802. It also includes a number of services 804a-804c, more specifically, a "start" service 804a for starting the integrated application, an "acmePreProxy" service 804b offering certain integration services for the pre-proxy state operations of example adaptor 206 (invocation of the "configurator" application), and an "acmeEditPage" service 804c for inserting the "configure order" button into the "edit order" page of the "order entry" application.

Example services 804a-804c include example flows 804a-804c of example tasks 810a-810d to be executed when the service is invoked. Example tasks 810a-810d include example calls to other services, such as example calls 812a-812e. Example services 804a-804c also include example parameters 806a-806e to affect task executions. Further, example services 804a-804c include example "connector sources" and connector destinations" 828a-828g, for tracking the "state" of the composite application.

As described earlier, example integrator 204 identifies the adaptors of the underlying applications, 814 and 820. Example integrator 204 also provides for a handler interface for the example adaptors, 816, and identifies the adaptors as its clients, 818. Further, example integrator 204 identifies 822 proxy 202, and includes a private service "addConfigureButton" 826.

As illustrated in FIGS. 9a-9d and 10a-10f, example adaptors of the "order entry" and "configurator" applications include declaration/identification of the respective implementations of the "Adaptor" interface, 902 and 1002.

Example adaptor for the "order entry" application 206 includes a reference to the "acme/Handler" interface provisioned by example integrator 204.

Example adaptors include a number of services 904a-904c and 1004, "createOorder", "addItem" and "submitOrder" for the "order entry" application adaptor 206, and "configureItem" for the "configurator" application adaptor 206.

Both example adaptors identify 906 and 1006 proxy 202, and declare implementation of the "proxyHandler" interface, 908-910 and 1008-1010.

Both example adaptors include pre-proxy state operations 912 and 1012 to be executed when proxy 202 is in a "pre-proxy" state, and post-proxy state operations 914 and 1014, to be executed when proxy 202 is in a "post-proxy" state.

Each of the services 904a-904c and 1004 includes flows of tasks to be executed when the service is invoked. Similarly, each task selectively invokes other services, and the execution is affected by the service' parameters. In like manner "connector destinations" and "connector sources" are employed to track the states of the adaptors.

Also similar to example integrator 204, example adaptors 206 include private utilities "postToURL" 920 and "addDoneButton" and "makeBOM" 1020a-1020b (BOM=Bill of Materials), private variables "createURL" 918a, "editURL" 918b, "startURL" 1018a and "bom" 1018b.

Resultantly, underlying "order entry" application and "configurator" application may be integrated in a relatively more efficient manner.

Advantages

The present invention has the following potential advantages:
  It operates in a completely or substantially non-intrusive manner, requiring little or no change to the applications being integrated.
  The implementation can reside virtually anywhere in the network between the client Web browser and the applications being integrated. Further, it requires little or no changes to the client Web browser or installation of software on the client machine.
  It enables the creation and use of fully interactive services in addition to discrete, computational services.

CONCLUSION AND EPILOGUE

Thus, it can be seen from the above descriptions, a novel composite application provisioning method and apparatus has been described.

While the present invention has been described in terms of the above described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A computer readable storage medium, comprising executable instructions to:
  define a composite application platform supporting a set of web-based applications responsive to web browser requests, the composite application platform including:
  a proxy service to support communications between the set of web-based applications and a set of clients generating web browser requests,
  a set of application adaptors in communication with the proxy service, each application adaptor supporting communication with a designated web-based application of the set of web-based applications; and
  a composite application integrator operative with the proxy service and the set of application adaptors, the composite application integrator supporting a first client web browser request from the set of clients to provide content from a first web-based application of the set of web-based applications and further supporting a second client web browser request from the set of clients to provide composite content that combines and formats output of two or more web-based applications of the set of web-based applications;
  wherein the composite application integrator includes executable instructions to identify a proxy.

2. The computer readable storage medium of claim 1 wherein the proxy service provisions the set of web-based applications.

3. The computer readable storage medium of claim 2 wherein the application adaptors modify the set of web-based applications.

4. The computer readable storage medium of claim 1 wherein the composite application integrator includes executable instructions to identify adapters.

5. The computer readable storage medium of claim 1 wherein the composite application integrator includes executable instructions to provide handler interfaces.

6. The computer readable storage medium of claim 1 wherein the composite application integrator includes executable instructions to identify adapters as handler clients.

7. The computer readable storage medium of claim 1 wherein an application adaptor of the set of application adaptors includes executable instructions to identify a handler and a handler interface.

8. The computer readable storage medium of claim 1 wherein an application adaptor of the set of application adaptors includes executable instructions to implement an interface proxy handler.

9. The computer readable storage medium of claim 1 wherein an application adaptor of the set of application adaptors includes executable instructions to supply a proxy handler.

10. The computer readable storage medium of claim 1 wherein an application adaptor of the set of application adaptors includes executable instructions to identify a proxy as a client.

11. The computer readable storage medium of claim 1 wherein an application adaptor of the set of application adaptors includes executable instructions to perform pre-proxy state processing.

12. The computer readable storage medium of claim 1 wherein an application adaptor of the set of application adaptors includes executable instructions to perform post-proxy state processing.

* * * * *